(12) United States Patent
Shih

(10) Patent No.: US 9,564,712 B1
(45) Date of Patent: Feb. 7, 2017

(54) CONNECTING ASSEMBLY FOR SECURING TWO EXPANSION CARDS

(71) Applicant: HON HAI PRECISION INDUSTRY CO., LTD., New Taipei (TW)

(72) Inventor: Tung-Ho Shih, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/949,027

(22) Filed: Nov. 23, 2015

(30) Foreign Application Priority Data

Oct. 30, 2015 (CN) .......................... 2015 1 0720645

(51) Int. Cl.
| | | |
|---|---|---|
| H01R 12/00 | (2006.01) | |
| H01R 13/639 | (2006.01) | |
| H01R 12/70 | (2011.01) | |
| H01R 12/52 | (2011.01) | |

(52) U.S. Cl.
CPC ........ H01R 13/639 (2013.01); H01R 12/7076 (2013.01); H01R 9/096 (2013.01); H01R 12/52 (2013.01); H01R 12/523 (2013.01)

(58) Field of Classification Search
CPC ........ H01R 12/52; H01R 12/523; H01R 9/096
USPC ............................................. 439/65, 74, 75
See application file for complete search history.

(56) References Cited

U.S. PATENT DOCUMENTS

| | | | | | |
|---|---|---|---|---|---|
| 2,025,619 | A | * | 12/1935 | Scotncy ................... | H05K 7/06 361/803 |
| 5,059,130 | A | * | 10/1991 | Miller, Jr. ............ | H01R 12/523 439/74 |
| 5,334,029 | A | * | 8/1994 | Akkapeddi ............ | H01R 12/52 439/66 |
| 2014/0162470 | A1 | * | 6/2014 | Fricker ................ | H01R 12/523 439/65 |
| 2015/0144376 | A1 | * | 5/2015 | Taketani ................ | H05K 7/142 174/113 R |

* cited by examiner

*Primary Examiner* — Tho D Ta
(74) *Attorney, Agent, or Firm* — Zhigang Ma

(57) ABSTRACT

A connecting assembly for mounting a first expansion card and a second expansion card in a motherboard. The connecting assembly includes at least one fixing member, a first locking member and a second locking member. Each fixing member includes a first clamping portion and a second clamping portion, the fixing member is detachably assembled on the motherboard. The motherboard is held between the first clamping portion and the second clamping portion, the fixing member fixes the first expansion card and the second expansion card with the motherboard through the first locking member and the second locking member.

19 Claims, 7 Drawing Sheets

CONNECTING ASSEMBLY FOR SECURING TWO EXPANSION CARDS

FIELD

The subject matter herein generally relates to a connecting assembly.

BACKGROUND

An electronic device, such as a server, generally includes an expansion card mounted on a side of a motherboard to increase the storage capacity.

BRIEF DESCRIPTION OF THE DRAWINGS

Implementations of the present technology will now be described, by way of example only, with reference to the attached figures.

DETAILED DESCRIPTION

Figure 1:
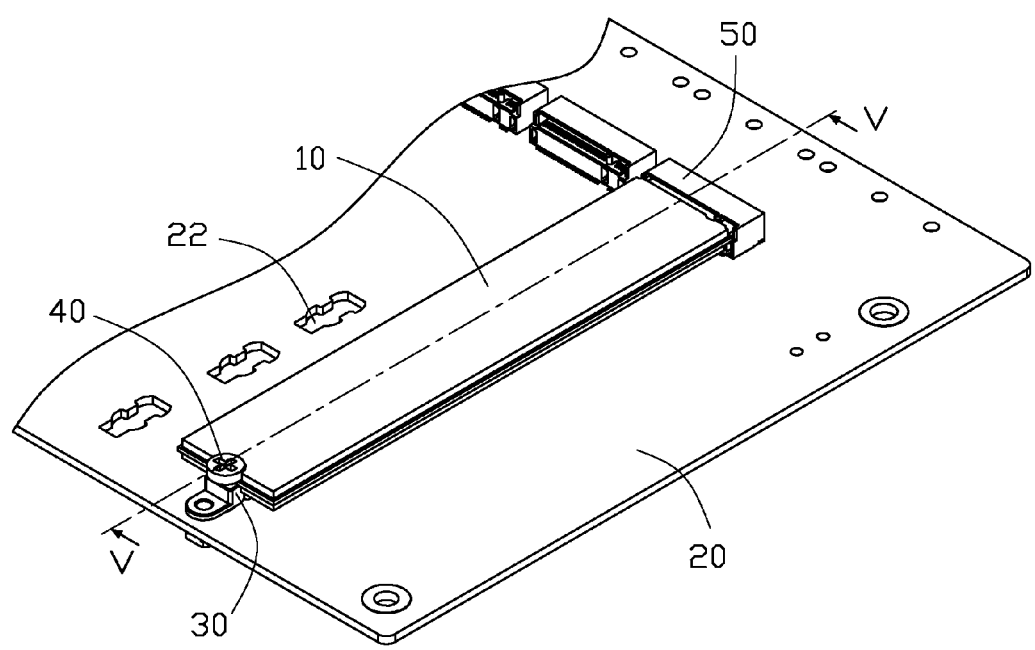
FIG. 1 is an assembled, isometric view of a first embodiment of a connecting assembly with a fixing member.
Figure 2:
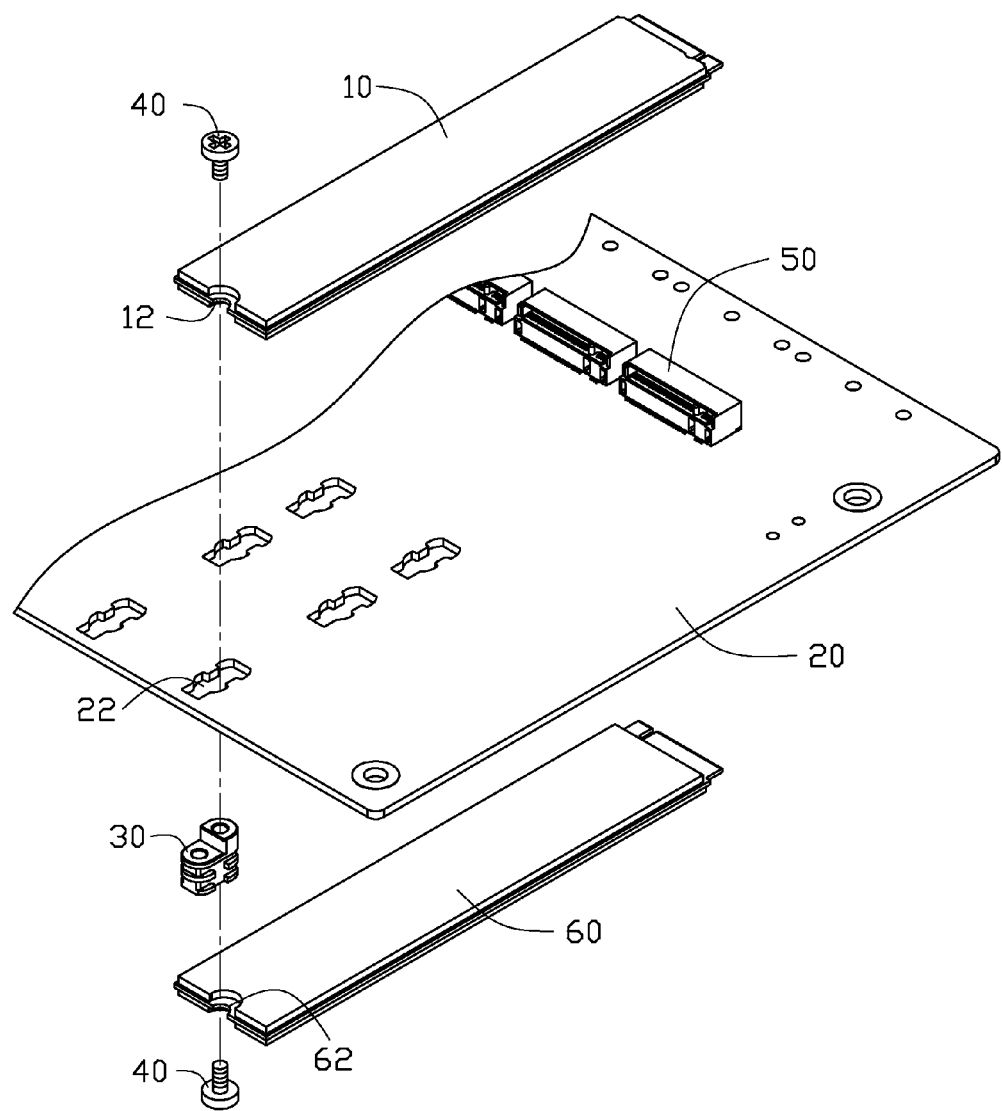
FIG. 2 is an exploded, isometric view of the connecting assembly of FIG. 1.
Figure 3:
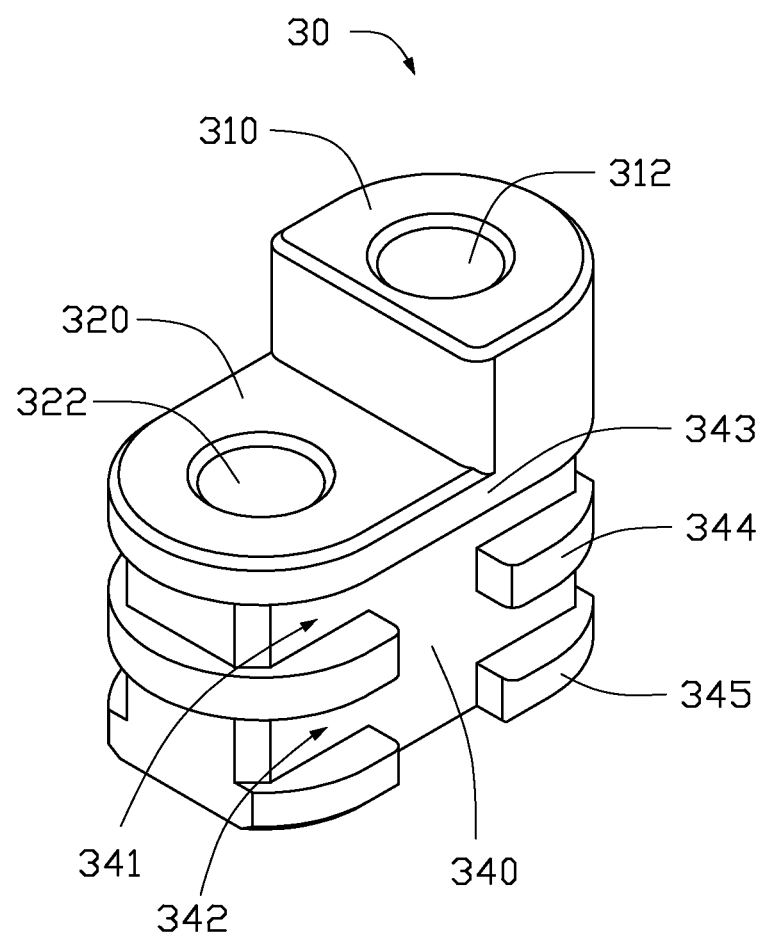
FIG. 3 is an isometric view of the fixing member of FIG. 1.
Figure 4:
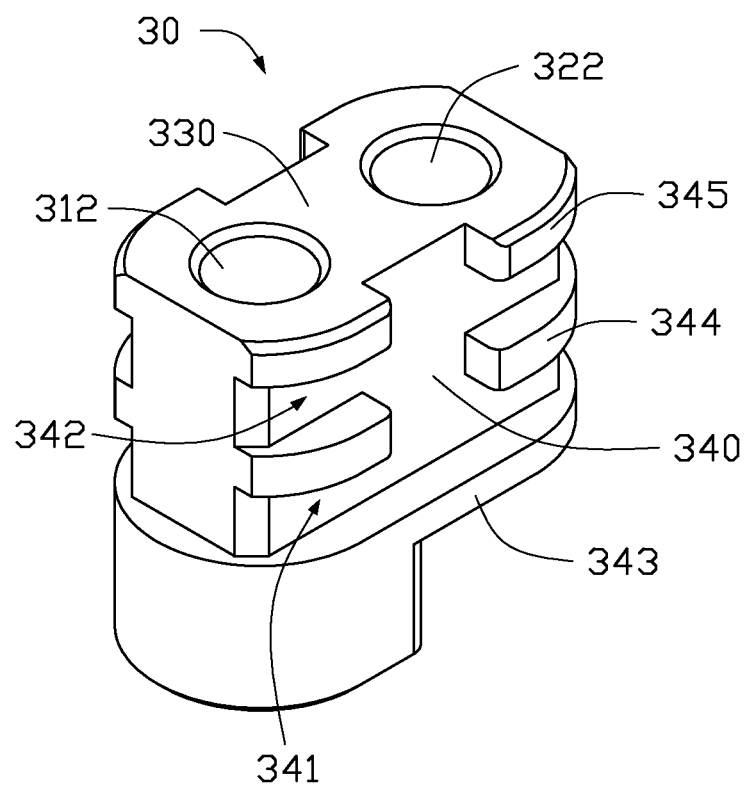
FIG. 4 is similar to FIG. 3, but viewed from another angle.
Figure 5:
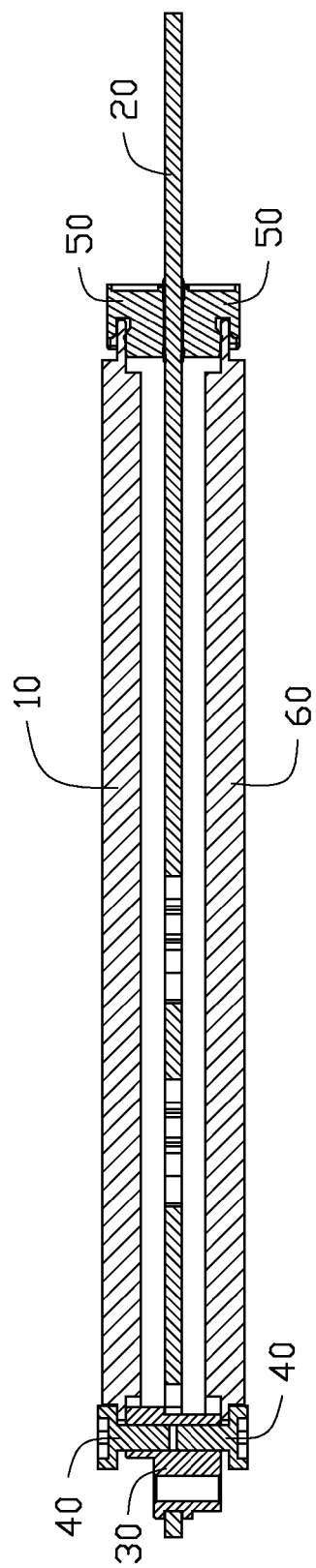
FIG. 5 is a cross sectional view of the connecting assembly, taken along a line V-V of FIG. 1.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

The present disclosure is described in relation to a connecting assembly.

FIGS. 1-5 illustrate an embodiment of a connecting assembly provided for fixing a first expansion card 10 and a second expansion card 60 (shown as FIG. 2) to a motherboard 20. When the size of the expansion card 10 is equal to the size of the expansion card 60, the connecting assembly comprises a first fixing member 30 and two locking members 40.

Two connectors 50 are defined in two opposite sides of the motherboard 20. A plurality of mounting holes 22 are defined in the motherboard 20, and the shape of each mounting hole 22 is the same as the cross-sectional area of the first fixing member 30. A stepped hole 12 is defined in a first end of the expansion card 10, a second end of the expansion card 10, opposite to the first end, is inserted into the connector 50 of a first side of the motherboard 20.

A first stepped hole 12 is defined in a first end of the expansion card 10, a second end of the expansion card 10, opposite to the first end, is inserted into the connector 50 of a first side of the motherboard 20.

A second stepped hole 62 is defined in a first end of the expansion card 60, a second end of the expansion card 60, opposite to the first end, is inserted into the connector 50 of a second side of the motherboard 20.

The first fixing member 30 comprises a first upper surface 310, a second upper surface 320, a bottom surface 330, and two side surfaces 340. In at least one embodiment, the first upper surface 310 is substantially parallel to the second upper surface 320 and the bottom surface 330. The second upper surface 320 is located between the first upper surface 310 and the bottom surface 330.

A fixing hole 312 is defined extending from the first upper surface 310 to the bottom surface 330. A fixing hole 322 is defined extending from the second upper surface 320 to the bottom surface 330. In at least one embodiment, the first upper surface 310 and the second upper surface 320 are step-shaped.

In at least one embodiment, both the fixing hole 312 and the fixing hole 322 are a screw holes, and the locking member 40 is a screw.

Two limiting grooves 341 and 342 are defined in the side surface 340 of the first fixing member 30, three clamping portions 343 to 345 are defined in two sides of the two limiting grooves 341 and 342. The limiting groove 341 is located between the clamping portion 343 and the clamping portion 344. The limiting groove 342 is located between the clamping portion 344 and the clamping portion 345. In at least one embodiment, a distance between the first upper surface 310 to the bottom end of the limiting groove 341 is equal to a distance between the second upper surface 320 to the bottom end of the limiting groove 342.

In assembly, the first fixing member 30 is moved to align with the mounting hole 22, and the first fixing member 30 is perpendicularly mounted to the mounting hole 22. The motherboard 20 extends through the limiting groove 341 and is engaged between the clamping portion 343 and the clamping portion 344. The second end of the expansion card 10 is inserted into the connector 50 of the first side of the motherboard 20. The locking member 40 extends through the first stepped hole 12 and is engaged in the fixing hole 312 of the first upper surface 310, to fix the expansion card 10 with the first fixing member 30. Thereby, the locking member 40 is held in the first stepped hole 12 of the expansion card 10, to prevent the expansion card 10 from being engaged from the first fixing member 30. The second end of the expansion card 60 is inserted into the connector 50 of the second side of the motherboard 20. The locking member 40 extends through the second stepped hole 62 and is engaged in the fixing hole 312 of the bottom surface 330, to fix the expansion card 60 with the first fixing member 30. Thereby, the locking member 40 is held in the second stepped hole 62 of the expansion card 60, to prevent the expansion card 60 from being engaged from the first fixing member 30.

Figure 6:
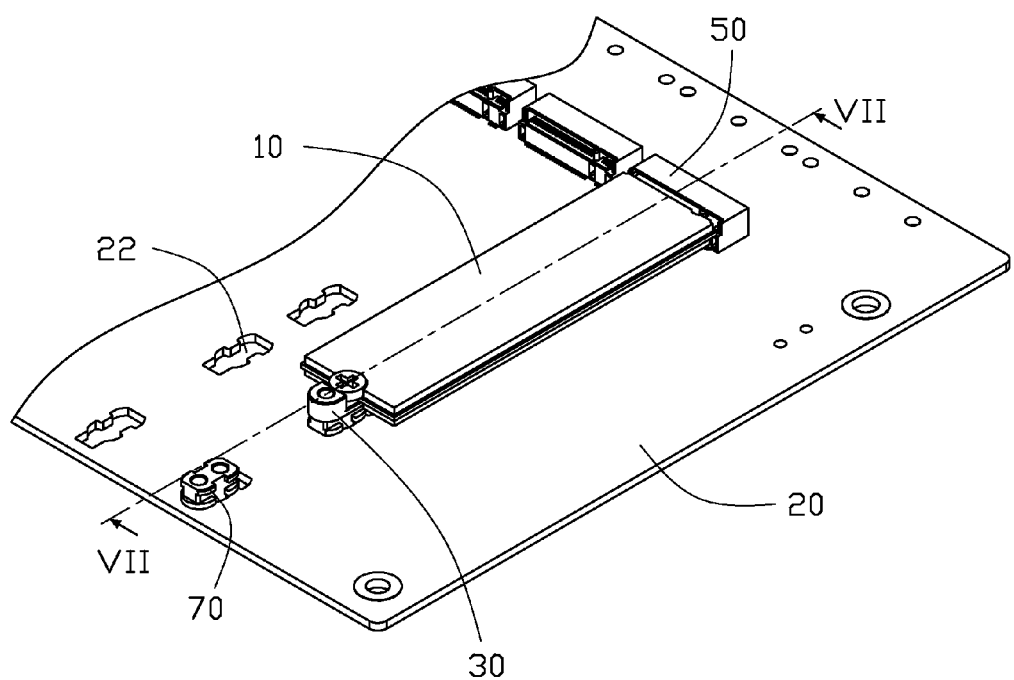
FIG. 6 is an assembled, isometric view of a second embodiment of the connecting assembly.
Figure 7:
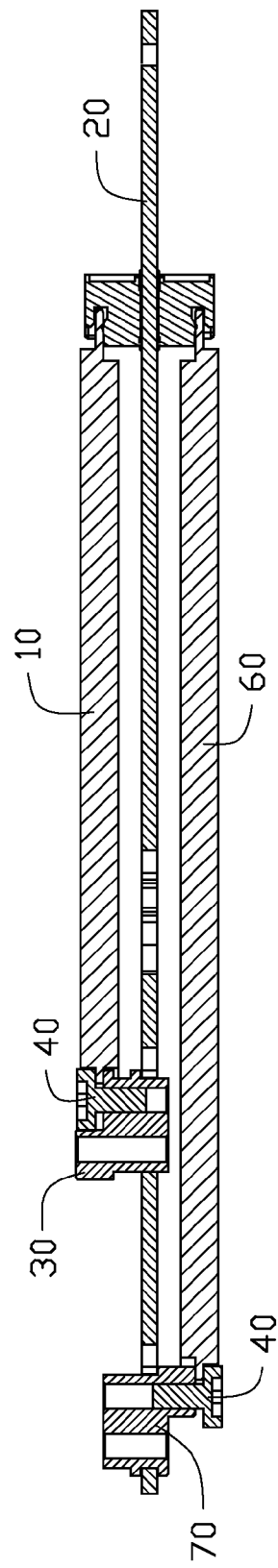
FIG. 7 is a cross sectional view of the connecting assembly, taken along a line VII-VII of FIG. 6.

FIG. 6 and FIG. 7 show the connecting assembly further comprises a second fixing member 70 in a second embodiment.

The size of expansion card 10 is different from the size of expansion card 60. For example, the length of the expansion card 60 is longer than the length of the expansion card 10. The second fixing member 70 is turned 180 degrees relative to the first fixing member 30 about a horizontal axis.

The motherboard 20 extends through the limiting groove 342 and is engaged between the clamping portion 344 and the clamping portion 345. The second end of the expansion card 10 is inserted into the connector 50 of the first side of the motherboard 20. The locking member 40 extends through the first stepped hole 12 and is engaged in the fixing hole 322 of the first upper surface 320, to fix the expansion card 10 with the first fixing member 30. Thereby, the locking member 40 is held in the first stepped hole 12 of the expansion card 10, to prevent the expansion card 10 from being engaged from the first fixing member 30.

The motherboard 20 extends through the limiting groove 341 and is engaged between the clamping portion 343 and the clamping portion 344. The second end of the expansion card 60 is inserted into the connector 50 of the second side of the motherboard 20. The locking member 40 extends through the second stepped hole 62 and is engaged in the fixing hole 312 of the first upper surface 330, to fix the expansion card 60 with the first fixing member 70. Thereby, the locking member 40 is held in the second stepped hole 62 of the expansion card 60, to prevent the expansion card 60 from being disengaged from the first fixing member 70.

While the disclosure has been described by way of example and in terms of a preferred embodiment, it is to be understood that the disclosure is not limited thereto. On the contrary, it is intended to cover various modifications and similar arrangements as would be apparent to those skilled in the art. Therefore, the range of the appended claims should be accorded the broadest interpretation so as to encompass all such modifications and similar arrangements.

What is claimed is:

1. A connecting assembly for mounting a first expansion card and a second expansion card in a motherboard, the connecting assembly comprising:
    at least one fixing member;
    a first locking member and a second locking member;
    a first connector configured to secure a first end of the first expansion card to the motherboard; and
    a second connector configured to secure a first end of the second expansion card to the motherboard;
    wherein each fixing member comprises a first clamping portion and a second clamping portion, the fixing member is detachably assembled on the motherboard; and
    wherein the motherboard is held between the first clamping portion and the second clamping portion, the first locking member is secured to the fixing member and secures a second end of the first expansion card to the motherboard and positions the first expansion card on an upper side of the motherboard, and the second locking member is secured to the fixing member and secures a second end of the second expansion card to the motherboard and positions the second expansion card on a bottom side of the motherboard, opposite to the upper side of the motherboard.

2. The connecting assembly of claim 1, wherein the first expansion card comprises a first stepped hole, the second expansion card comprises a second stepped hole, the fixing member comprises a first upper surface and a bottom surface, a first fixing hole is defined extending from the first upper surface to the bottom surface, the first locking member extends through the first stepped hole and is engaged in the first fixing hole of the first upper surface to fix the first expansion card with the fixing member, the second locking member extends through the second stepped hole and is engaged in the first fixing hole of the bottom surface to fix the second expansion card with the fixing member.

3. The connecting assembly of claim 2, wherein the fixing member further comprises a second upper surface, and a second fixing hole is defined extending from the second upper surface to the bottom surface.

4. The connecting assembly of claim 3, wherein the first upper surface and the second upper surface are step-shaped.

5. The connecting assembly of claim 3, wherein the first upper surface is substantially parallel to the second upper surface and the bottom surface, the second upper surface is located between the first upper surface and the bottom surface.

6. The connecting assembly of claim 5, wherein the fixing member further comprises a first limiting groove, a second limiting groove, and a third clamping portion, the first limiting groove is located between the first clamping portion and the second clamping portion, the second limiting groove is located between the second clamping portion and the third clamping portion.

7. The connecting assembly of claim 6, wherein a distance between the first upper surface to the bottom end of the first limiting groove is equal to a distance between the second upper surface to the bottom end of the second limiting groove.

8. The connecting assembly of claim 3, wherein each of the first fixing hole and the second fixing hole is a screw hole, each of the first locking member and the second locking member is a screw.

9. The connecting assembly of claim 1, wherein the second fixing member is turned 180 degrees relative to the first fixing member about a horizontal axis.

10. The connecting assembly of claim 1, wherein the first locking member extends in a first direction from the upper side towards the bottom side of the motherboard, and the second locking member extends in a second direction from the bottom side towards the upper side of the motherboard.

11. A connecting assembly for mounting a first expansion card and a second expansion card, shorter than the first expansion card, in a motherboard, the connecting assembly comprising:
    a first fixing member and a second fixing member; and
    a first locking member and a second locking member;
    wherein each of the first fixing member and the second fixing member comprises a first clamping portion, a second clamping portion, and a third clamping portion, the two fixing members are detachably assembled on the motherboard; and
    wherein the motherboard is held between the first clamping portion and the second clamping portion of the first fixing member and further held between the second clamping portion and the third clamping portion of the second fixing member, the first locking member is secured to the first fixing member and secures the first expansion card to an upper side of the motherboard, and the second locking member is secured to the second fixing member and secures the second expansion card to a bottom side of the motherboard, opposite to the upper side of the motherboard;

wherein both the first fixing member and the second fixing member comprise a first upper surface, a second upper surface, and a bottom surface, a first fixing hole is defined to extend from the first upper surface to the bottom surface, a second fixing hole is defined to extend from the second upper surface to the bottom surface, the first locking member is engaged in the first fixing hole, and the second locking member is engaged in the second fixing hole.

12. The connecting assembly of claim 11, wherein the first expansion card comprises a first stepped hole, the second expansion card comprises a second stepped hole the first locking member extends through the first stepped hole to fix the first expansion card with the first fixing member, and the second locking member extends through the second stepped hole to fix the second expansion card with the second fixing member.

13. The connecting assembly of claim 12, wherein the first upper surface and the second upper surface are step-shaped.

14. The connecting assembly of claim 13, wherein the first upper surface is substantially parallel to the second upper surface and the bottom surface, the second upper surface is located between the first upper surface and the bottom surface.

15. The connecting assembly of claim 14, wherein each of the first fixing member and the second fixing member further all comprises a first limiting groove, a second limiting groove, and a third clamping portion, the first limiting groove is located between the first clamping portion and the second clamping portion, the second limiting groove is located between the second clamping portion and the third clamping portion.

16. The connecting assembly of claim 15, wherein a distance between the first upper surface to the bottom end of the first limiting groove is equal to a distance between the second upper surface to the bottom end of the second limiting groove.

17. The connecting assembly of claim 12, wherein each of the first fixing hole and the second fixing hole is a screw hole, each of the first locking member and the second locking member is a screw.

18. The connecting assembly of claim 11, wherein the first locking member extends in a first direction from the upper side towards the bottom side of the motherboard, and the second locking member extends in a second direction from the bottom side towards the upper side of the motherboard.

19. The connecting assembly of claim 11, wherein the second fixing member is turned 180 degrees relative to the first fixing member about a horizontal axis.

* * * * *